United States Patent [19]

Sircar

[11] Patent Number: 5,240,472
[45] Date of Patent: Aug. 31, 1993

[54] MOISTURE REMOVAL FROM A WET GAS

[75] Inventor: Shivaji Sircar, Wescosville, Pa.

[73] Assignee: Air Products and Chemicls, Inc., Allentown, Pa.

[21] Appl. No.: 890,403

[22] Filed: May 29, 1992

[51] Int. Cl.$^5$ .................. B01D 53/22; B01D 71/02; B01D 53/04
[52] U.S. Cl. .......................... 95/52; 95/120; 95/126
[58] Field of Search .................. 55/16, 25, 26, 28, 33, 55/68, 158

[56] References Cited

U.S. PATENT DOCUMENTS

| | | | |
|---|---|---|---|
| 2,584,785 | 2/1952 | Bowman et al. | 55/16 |
| 2,627,933 | 2/1953 | Teter | 55/158 |
| 4,175,153 | 11/1979 | Dobo et al. | 55/16 X |
| 4,249,915 | 2/1981 | Sircar et al. | 55/26 |
| 4,427,434 | 1/1984 | Charpin et al. | 55/158 |
| 4,472,178 | 9/1984 | Kumar et al. | 55/28 X |
| 4,504,285 | 3/1985 | Modisette | 55/16 |
| 4,583,996 | 4/1986 | Sakata et al. | 55/16 |
| 4,671,809 | 6/1987 | Taketomo et al. | 55/158 |
| 4,690,695 | 9/1987 | Doshi | 55/16 |
| 4,701,187 | 10/1987 | Choe et al. | 55/16 |
| 4,718,921 | 1/1988 | Makino et al. | 55/16 |
| 4,857,081 | 8/1989 | Taylor | 55/16 |
| 4,865,630 | 9/1989 | Abe | 55/158 |
| 4,881,953 | 11/1989 | Prasad et al. | 55/16 |
| 4,902,307 | 2/1990 | Gavalas et al. | 55/16 |
| 4,931,070 | 6/1990 | Prasad | 55/16 |
| 4,934,148 | 6/1990 | Prasad | 62/24 |
| 4,952,219 | 8/1990 | Di Martino, Sr. | 55/16 |
| 5,069,794 | 12/1991 | Haag et al. | 55/16 X |
| 5,104,425 | 4/1992 | Rao et al. | 55/16 |
| 5,110,478 | 5/1992 | Haag et al. | 55/16 X |
| 5,139,540 | 8/1992 | Najjar et al. | 55/16 |

FOREIGN PATENT DOCUMENTS

| | | | |
|---|---|---|---|
| 61-136416 | 6/1986 | Japan | 55/16 |
| 63-185429 | 8/1988 | Japan | 55/16 |
| 3-143523 | 6/1991 | Japan | 55/16 |
| WO91/08826 | 6/1991 | PCT Int'l Appl. | 55/16 |

OTHER PUBLICATIONS

A. J. Burggraaf et al., "Ceramic Nanostructure Materials, Membranes and Composite Layers", *Solid State Ionics*, 32/33 (1989) 771-782, North-Holland, Amsterdam.

Hawley's Condensed Chemical Dictionary, Eleventh Edition, p. 1038.

*Primary Examiner*—Robert Spitzer
*Attorney, Agent, or Firm*—Russell L. Brewer; James C. Simmons; William F. Marsh

[57] ABSTRACT

This invention pertains to an improved process for the removal of moisture from a moisture laden gas stream such as air utilizing a membrane dryer unit. The membrane dryer unit is equipped such that it incorporates a selective surface flow adsorbent membrane consisting essentially of an inorganic membrane material selected from the group consisting of alumina and silica gel membranes wherein the membrane has a thickness of approximately 0.5 to 50 microns with a mean pore size of less than about 15 A and preferably within about 4 to 10 A. In the cryogenic separation of air, an air stream contaminated with moisture and carbon dioxide is passed through the membrane dryer unit in countercurrent flow to a dry purge gas, wherein the water is selectively removed from the air stream. The partially dried air stream then is conveyed to an adsorption system operated under thermal swing or pressure swing conditions wherein the residual water and carbon dioxide are removed.

5 Claims, 1 Drawing Sheet

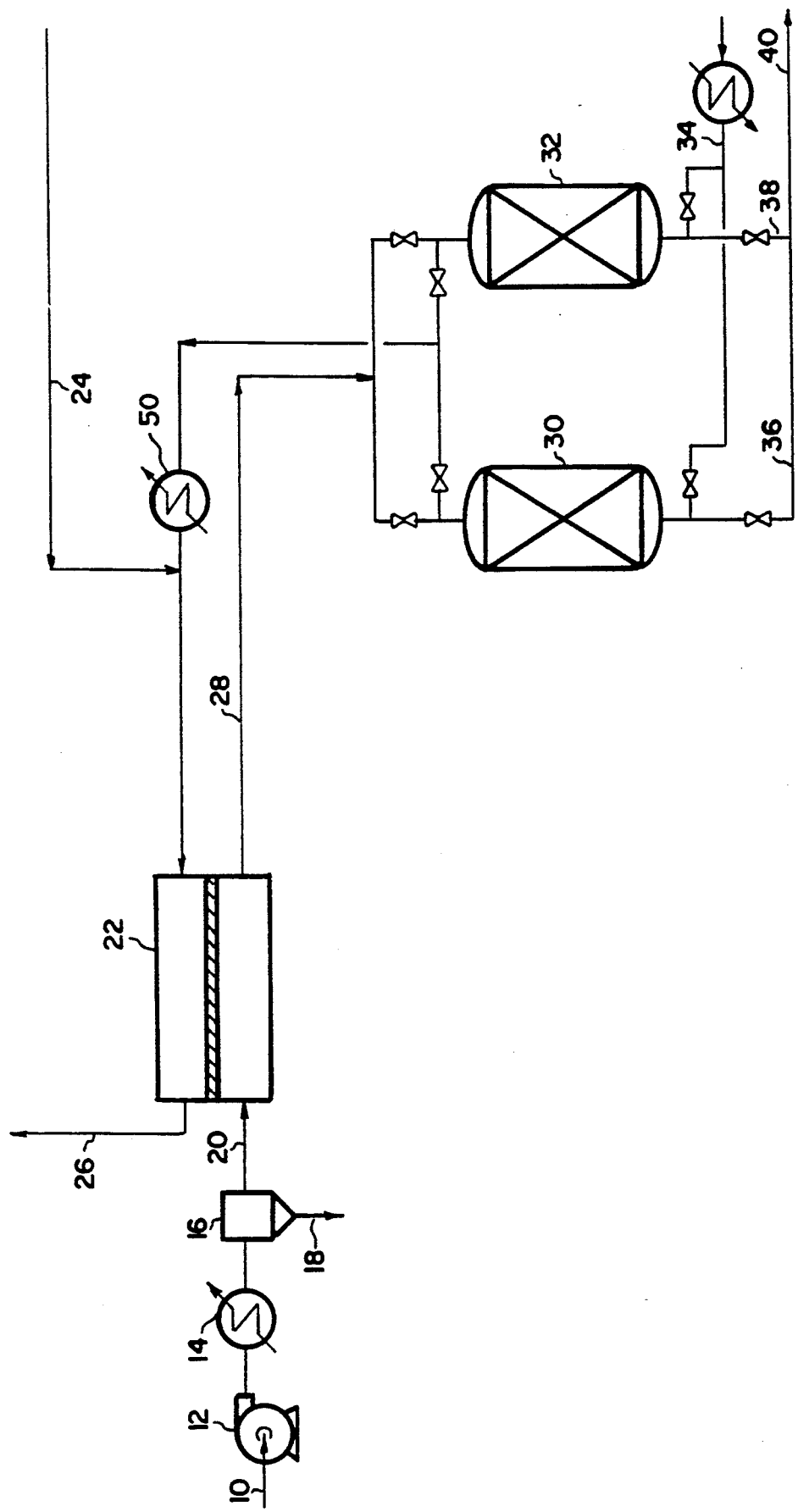

MOISTURE REMOVAL FROM A WET GAS

BACKGROUND OF THE INVENTION

1. Field of the Invention

The present invention pertains to the removal of moisture from a gas; the invention is particularly suited for the removal of moisture required in the pretreatment of air for separation into its components via a cryogenic air separation process.

2. Prior Art

Processes for preparing a nitrogen-rich or oxygen-rich stream from a gas comprising nitrogen and oxygen and contaminated with water such as ambient air with the gas being passed to a pretreatment unit for the removal of moisture to avoid problems downstream are known. It is known that if water and carbon dioxide are not removed from the air, these components will freeze and block heat exchangers employed for cooling the gas prior to cryogenic distillation. There are essentially three commercial methods for removing water and carbon dioxide from a gas stream contaminated with water, possibly carbon dioxide and these include adsorption either by thermal swing adsorption (TSA) or pressure swing adsorption (PSA) and membranes for the removal of water, or, combinations of these three processes.

Representative patents which show the preparation of air streams utilizing pretreatment processes for the removal of water and/or carbon dioxide prior to recovery of at least the nitrogen or the oxygen component from a gas stream, including nitrogen or oxygen recovery by cryogenic processing are as follows:

U.S. Pat. No. 4,249,915 discloses a combination of adsorption systems initially utilizing pressure swing adsorption for the removal of moisture from air followed by thermal swing adsorption for the removal of carbon dioxide prior to cryogenic distillation of air into its components. Water is removed by pressure swing adsorption incorporating aluminas or alumino-silicate adsorbents, such as 5A and 13X zeolites, at pressures ranging from 3 to 20 bar. Thermal swing adsorption is carried out utilizing a 5A or 13X molecular sieve suited for selectively adsorbing carbon dioxide from a dilute $CO_2$ containing gas stream. Temperatures range from about ambient temperature to 150°C.

U.S. Pat. No. 4,931,070 discloses a process for the production of dry, high purity nitrogen utilizing a pretreatment system incorporating dual stage membrane removal of water followed by catalytically removing oxygen by combustion with hydrogen followed by residual removal of moisture utilizing a membrane dryer. The purge gas is used to enhance drying by passing the purge gas countercurrent to gas flow on the permeate side of the membrane drier unit. Representative membranes suited for water removal include those having a water/nitrogen separation factor of at least 50 preferably greater than 1,000 and are constructed of cellulose acetate, ethyl cellulose, silicon rubber, polyurethanes, polyamides and polysytrene.

U.S. Pat. No. 4,952,219 discloses a pretreatment process for producing high purity nitrogen by low temperature separation of air wherein the pretreatment process comprises passing feed air over a membrane selective to the permeation of water, then passing the partially dried air stream over a molecular sieve adsorbent to remove residual water and carbon dioxide and then introducing the moisture-free/carbon dioxide free stream to a low temperature separation unit. Representative membranes suited for the removal of moisture are comprised of polytrimethylsilylpropyne, polysulfones, polyamides and cellulose acetate.

U.S. Pat. No. 4,934,148 discloses a prepurifier adsorption system suited for a cryogenic air separation process incorporating a membrane drier. The prepurifier adsorption system is characterized by a membrane unit operated in a countercurrent flow path followed by cleanup of the moisture-free permeate in an alternating bed adsorption system. The membrane materials are impermeable barrier materials which include cellulose acetate, silcone rubber, etc. The adsorption systems which can be utilized include a pressure swing adsorption system suited for the removal of carbon dioxide and other components including residual water. Alternatively, a thermal swing adsorption cycle may be used wherein adsorption is carried out at a low temperature followed by desorption at an elevated temperature.

U.S. Pat. No. 4,701,187 discloses a gas separation technique involving the interaction between a membrane drying unit and an adsorption unit for providing an efficient process for producing a high purity product stream at recoveries greater than could be achieved by either unit operating individually. Membrane systems incorporating cellulose acetate, polyamides, silicone rubber, polyphenyleneoxide and the like are suggested as being as suited for the membrane drying units. Adsorption system contemplated include pressure swing, temperature swing and vacuum swing units utilizing a variety of molecular sieve adsorbents including, such as, carbon molecular sieves and zeolitic materials which include cation exchanged zeolites from the faujasite and mordenite families.

U.S. Pat. No. 4,690,695 discloses a process for the separation of gas incorporating a membrane dryer unit and a pressure swing adsorption unit. Materials suited for the membrane dryer unit component include hollow fibers of cellulose acetate, cellulose triacetate, and polysulfone. Zeolitic adsorbents are used in the pressure swing adsorption unit.

SUMMARY OF THE INVENTION

This invention relates to an improved process for the removal of water from a gas stream and particularly to the removal of water from an air stream wherein water and carbon dioxide are removed in a pretreatment system and then the air stream cryogenically fractionated into its components.

A conventional process for the removal of water from a gas containing stream has been through the use of a membrane dryer system wherein a moisture laden feed gas is passed on one side of a membrane dryer unit suited for the selective removal of water and for the passage of a moisture-free purge gas is passed on the other side of the membrane dryer unit to enhance permeation of water through the membrane to the moisture-free purge gas. The partially dried moisture laden feed gas then is passed through an adsorption unit wherein residual water and carbon dioxide are selectively adsorbed onto an adsorbent and subsequently removed therefrom by regeneration of the adsorbent. The improvement in the overall membrane dryer process comprises utilizing a selective surface flow adsorbent membrane as the membrane in the membrane dryer unit, wherein the selective surface flow adsorbent membrane consists essentially of an inorganic material coated onto a support wherein said selective surface flow adsorbent membrane is microporous and has pores having a diameter generally less than 15 angstroms.

There are significant advantages associated with the membrane dryer unit of this invention utilized for the treatment of gas streams and particularly air streams and to the combination of the membrane dryer unit coupled with a thermal swing adsorption system.

These advantages include:

an ability to selectively remove water with enhanced efficiency;

an ability to remove water from a moisture laden gas stream with low energy requirements: and an ability to remove moisture from an air stream and membrane units of significantly reduced size as compared to prior art membrane units.

DRAWING

The drawing is a process flow diagram representing an embodiment for the removal of moisture, as well as carbon dioxide via an adsorbent membrane dryer unit and adsorption system from an air stream which then can be cryogenically fractionated into its components.

DETAILED DESCRIPTION OF THE INVENTION

This invention pertains to an improved method for pre-drying gases utilizing an improved membrane dryer unit. The membrane unit permits removal of moisture from a moisture-containing gas stream, typically one containing nitrogen and oxygen, for subsequent enrichment of specific components in the gas through separation techniques. In a preferred embodiment the process is adapted for an air separation process. In such process an air stream containing water and carbon dioxide is passed through the membrane dryer unit wherein water is selectively removed and the partially dried permeate from the membrane dryer unit passed to an adsorption system, typically a thermal swing adsorption system for effecting the removal of residual water and carbon dioxide. Alternatively, a pressure swing adsorption system could be used.

To facilitate an understanding of the invention, reference is made to the drawing. Air is introduced via line 10 to compressor 12, wherein air is compressed to a pressure of about 3 to 15 bar. During compression the temperature air is increased, wherein the exhaust from the compressor is partially condensed in water condenser 14 by cooling to about 10°-40° C. The partially condensed stream from condenser 14 is separated in phase separator 16 with water being removed via line 18 as waste. The still moisture-laden air stream is removed as a vapor via line 20 to membrane dryer unit 22. Moisture levels in the stream to typical membrane dryer unit 22 will range from about 800 to 25,000 ppm.

Removal of moisture from air stream in line 20 is effected in membrane dryer unit 22. Membrane dryer unit 22 incorporates a selective surface flow adsorbent membrane for effecting removal of most of the water from the compressed air stream. The selective surface flow adsorbent membrane for dehydration of the compressed air stream by selective removal of water consists of a thin layer, typically from about 1 to 50 microns, of a microporous desiccant adsorbent film where the micropores in the microporous desiccant film are predominantly less than 15 angstroms (A) in diameter. Generally the pores will have a diameter of from 4 to about 8 A. The desiccant material is carried or supported on a mesoporous matrix where the average pore size of the mesoporous matrix is typically in excess of 0.005 micron in diameter and generally less than 20 microns in diameter. Alternatively the selective surface flow dehydrating membrane may be supported within the pores of the mesoporous matrix material.

The key to enhanced or selective moisture removal in the adsorbent membrane dryer unit is through a selective surface flow dehydrating membrane. This membrane is highly selective for the removal of water at greatly increased permeation rates as compared to conventional polymeric membranes utilized in the prior art. The selective surface flow membrane effects removal of water via water permeation by selective adsorption and surface diffusion, rather than by dissolution and bulk diffusion as is characteristic of the membranes utilized in the prior art. Apparently, because of the difference in the mechanism for removal water, the membranes utilized herein have a much higher permeability for water than polymeric membranes and thus permits a significant reduction in membrane area required for the membrane dryer unit vis-a-vis the prior art polymeric membranes. In addition because of the microporous nature of the membrane, there is a very high selectivity for water as compared to other components of air, e.g., nitrogen and oxygen due to blockage of the nitrogen and oxygen through the pores in the microporous selected surface flow membrane due to the presence of adsorbed water and selective adsorption of water which excludes nitrogen and oxygen adsorption and their subsequent surface flow.

The membrane consists essentially of an inorganic material selected from the group consisting of alumina and silica alumina. Preferably gamma-alumina is used as a selective surface flow adsorbent membrane. These membranes are formulated such that the thickness of the membrane ranges from about 0.5 to 50 microns preferably and the microporous nature of the membranes such that the pores are generally uniformly distributed throughout the membrane with the pores being of relatively uniform diameter. The mean pore size is less than 15 A and preferably the mean pore size diameter is within the range of 4 to 10 Angstroms.

The membranes may be prepared by a well known Sol-Gel technique as described by A. J. Burgraff, K. Keizer and B. A. Van Hassel in an article published in Solid State Ionics, Vol. 32, pp. 771-782 (1989) which is incorporated by reference. The colloidal gel route is described wherein one first prepares a stable colloidal suspension of particles (SOL) of alumina or silica in a liquid medium by hydrolysis and peptization of a precursor which can be either a salt or an alkoxide. The particles sizes may be between 30 to 150 Angstroms in diameter. The Sols are then deposited on a mesoporous support to form a gel which is dehydrated and heated to form the active microporous selective surface flow adsorbent membrane.

The above described procedure essentially consists of three steps:

(a) Preparation of a stable suspension of a precursor material.

(b) Production of the selective surface flow adsorbent membrane by (a) repeated dipping of a mesoporous support in the suspension so that a thin dense layer of the precursor is formed on the support or by (b) sucking the precursor material within the pores of the support by applying a pressure differential across the support so that the pores of the support are essentially blocked by the precursor material.

(c) Thermally drying and activating the precursor material to produce the selective surface flow adsorbent membrane.

In particular, a $\gamma$-$Al_2O_3$ (gamma alumina) adsorbent membrane can be produced by first preparing a colloidal suspension of boehmite (A100H) which is peptized by an acid such as HCl or $HNO_3$. A dense layer of boehmite particles of 200–400Å diameter can then be deposited on the surface of a porous ceramic support or within the pores of the support by the methods (b) above. Finally, the boehmite layer can be heated to less than 900° C. to produce a thin $\gamma$-$Al_2O_3$ layer supported by the ceramic material. The support can be flat plate or tubular or monolith (honeycomb) in shape.

To effect selective removal of water from the feed gas in the membrane dryer unit 22, the moisture laden feed is conveyed via line 20 to membrane dryer unit 22 and caused to flow along the membrane. A nearly moisture-free waste gas typically is passed in countercurrent relationship to the flow of moisture laden feed. The utilization of a purge gas or moisture-free purge gas enhances diffusion of water vapor through the selective surface flow adsorbent membrane and thereby enhances removal of moisture from the feed gas through the membrane dryer unit. In typical operation, a source of dry gas, typically waste nitrogen from a cryogenic air separation plant, is conveyed via line 24 to a membrane dryer unit 22 and removed as a moisture laden waste gas via line 26. Typically a pressure drop across the membrane dryer unit will range from about 1 to 10 psia.

The dried non-permeate from membrane dryer unit 22 is removed via line 28 and from there it is conveyed to an adsorption system comprising alternating adsorption beds 30 and 32. These adsorption beds are filled with a zeolitic material suited for the selective removal of residual water in the non-permeate stream 28 as well as for the removal of carbon dioxide. In a thermal swing adsorption system, the zeolites typically are 5A and 13X while in a pressure swing adsorption system, the zeolites also are 5A and 13X. Preferably, the process is operated in its thermal swing mode since the removal of carbon dioxide and residual water from the stream can be effected rather easily. Unlike water, carbon dioxide may be removed thermally without significant energy input into the adsorption system. Moisture removal systems as represented in the prior art processes were energy intensive when operated in the thermal swing adsorption mode due to the large amount of energy required to effect desorption of water from the zeolite material.

The methods for removing residual water and carbon dioxide from a nitrogen containing gas stream such as air are well known and the methods can be used in operating adsorbers 30 and 32 in both the thermal swing or pressure swing mode. Preferably, the adsorbers are operated in a thermal swing mode utilizing 13X zeolite. Temperatures of adsorption typically range from 10° to 40° C. and at pressures of 3 to 15 bar. Desorption is effected by elevating the temperature in the bed to temperatures of at least 100°C. and preferably within the range of 100° to 250° C. Adsorbers 30 and 32 are operating in an alternating mode that is one unit is operated under adsorption conditions while the other is undergoing regeneration and cooling. Typically, desorption is effected by elevating the temperature of the adsorption bed and passing a dry stream via line 34 countercurrent to the direction of flow of the moisture laden gas through adsorbers 30 and 32. The hot effluent gas from the adsorber as well as the subsequent cooling effluent is passed through the membrane drier 22 to provide a part of the purge gas after appropriate cooling in heat exchanger 50 to the membrane purge temperature. Product gas is withdrawn from adsorber 30, via line 36 where it is tied in with line 38 from adsorber 32 and then conveyed via line 40 to a separation unit, such as an air separation unit to recover the nitrogen, oxygen and argon.

The following example is intended to illustrate preferred embodiments of the inventions and is not intended to restrict the scope thereof.

EXAMPLE 1

Pretreatment of Moisture Laden Air

A series of tests is carried out in an air pretreatment system incorporating the membrane dryer unit 22 and adsorber units 30 and 32 operated in the thermal swing mode for the purpose of determining the effectiveness of the process in removing water from moisture laden air.

A cryogenic plant capable of producing 300 MSCFH nitrogen product with a recovery of approximately 50%, requires 200 g moles per second of compressed (7.1 bar) air saturated with water. A level of water in such air stream typically is in a range of 4900 ppm at 27° C. A gamma alumina selective surface flow adsorbent membrane is used in the dryer unit which had a surface area of approximately 750 square feet. Air can be passed in countercurrent flow through the membrane dryer unit and substantially all of the moisture (moisture levels not greater than 10 ppm) are removed from the membrane dryer unit. From there the partially moisture laden stream is passed to the thermal swing adsorption unit for the removal of residual moisture and carbon dioxide.

If a conventional cellulose acetate were used as the membrane of the same thickness as the selective surface flow adsorbent membrane, the membrane surface area would be approximately 10 times, or 7800 square feet of membrane surface, for carrying out the same degree of drying.

What is claimed is:

1. An improved process for the production of a dry gas stream from a moisture laden stream in which a membrane system is used to selectively remove moisture from the gas stream, the improvement comprising:

passing a gas stream containing moisture to a membrane dryer unit capable of selectively permeating water present therein, said membrane dryer unit incorporating a selective surface flow adsorbent membrane consisting essentially of an organic material selected from the group consisting of $\gamma$-alumina and silica gel, said selective surface flow adsorbent membrane having pores which are predominantly less than 15 Å in diameter;

recovering a dry non-permeate gas from the membrane dryer unit; and removing water vapor as a permeate gas from a low pressure permeate side of the membrane dryer unit.

2. The process of claim 1, wherein a dry purge gas is passed in countercurrent relationship to the moisture laden gas to the membrane unit.

3. The process of claim 1, wherein the membrane has a thickness of from about 1 to 50 microns.

4. The process of claim 3 wherein the average pore size within the selective surface flow adsorbent membrane is from about 4 to 10 A.

5. An improved process for the production of a dry, high purity nitrogen and/or oxygen from air comprising:

passing a moisture laden feed air to a membrane dryer system capable of selectively permeating water therefrom and forming a partially dried feed air;

said membrane dryer system incorporating a selective surface flow adsorbent membrane consisting essentially of an inorganic material selected from the group consisting of γ-alumina and silica gel, said selective surface flow adsorbent membrane having pores which are predominantly less than 15 Å in diameter;

passing the partially dried feed air to a thermal swing adsorption system capable of selectively adsorbing residual water and carbon dioxide from the dry feed air;

passing the dry, prepurified feed air from said thermal swing adsorption system to a cryogenic air separation system for the cryogenic rectification of air, and the production of dry, high purity nitrogen and dry oxygen containing gas; and recovering the dry, high purity nitrogen and high purity oxygen gas from said from said cryogenic air separation system.

* * * * *